(12) United States Patent
Lee et al.

(10) Patent No.: US 10,528,634 B2
(45) Date of Patent: Jan. 7, 2020

(54) METHOD AND APPARATUS FOR VARIABLE SOCIAL NETWORK SERVICE

(71) Applicants: Jin Hyuk Lee, Seoul (KR); FORC & C CO., LTD., Seoul (KR)

(72) Inventors: Jin Hyuk Lee, Seoul (KR); Young Cheon Lee, Gyeonggi-do (KR); Yoon Hee Koo, Seoul (KR)

(73) Assignees: Jin Hyuk Lee, Seoul (KR); FORC & C CO., LTD., Seoul (KR)

( * ) Notice: Subject to any disclaimer, the term of this patent is extended or adjusted under 35 U.S.C. 154(b) by 351 days.

(21) Appl. No.: 15/510,939

(22) PCT Filed: Dec. 18, 2015

(86) PCT No.: PCT/KR2015/013955
§ 371 (c)(1),
(2) Date: Mar. 13, 2017

(87) PCT Pub. No.: WO2016/137102
PCT Pub. Date: Sep. 1, 2016

(65) Prior Publication Data
US 2017/0351766 A1    Dec. 7, 2017

(30) Foreign Application Priority Data
Feb. 25, 2015   (KR) .................. 10-2015-0026279

(51) Int. Cl.
*G06F 16/00* (2019.01)
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC ..................................................... G06Q 50/01
See application file for complete search history.

(56) References Cited

U.S. PATENT DOCUMENTS

| 7,707,122 | B2 | 4/2010 | Hull et al. |
| 7,904,511 | B2 * | 3/2011 | Ryan ............. G06Q 50/01 709/204 |

(Continued)

FOREIGN PATENT DOCUMENTS

| KR | 20120035606 A | 4/2012 |
| KR | 20130026611 A | 3/2013 |
| KR | 101302599 B1 | 9/2013 |

OTHER PUBLICATIONS

International Search Report in International Application No. PCT/KR2015/013955, filed Dec. 18, 2015.

*Primary Examiner* — Leslie Wong
(74) *Attorney, Agent, or Firm* — Saliwanchik, Lloyd & Eisenschenk

(57) ABSTRACT

Provided herein is a variable social network service method and apparatus. The variable social network service method includes receiving, by a variable social network service apparatus, information on whether or not a user serves as a bridge from a user apparatus of the user, and determining, by the variable social network service apparatus, whether or not to expand a social network based on the user based on the information on whether or not the user serves as the bridge, wherein the variable social network service apparatus determines whether or not social networking is possible between a first network subject of the user and a second network subject of the user depending on whether or not the user serves as the bridge.

10 Claims, 13 Drawing Sheets

(56) References Cited

U.S. PATENT DOCUMENTS

| | | | | | |
|---|---|---|---|---|---|
| 8,700,540 | B1* | 4/2014 | Zambrano | ............. | G06Q 50/01 |
| | | | | | 705/319 |
| 2008/0120397 | A1* | 5/2008 | Hartman | ............... | G06Q 10/10 |
| | | | | | 709/218 |
| 2011/0196924 | A1* | 8/2011 | Hargarten | ............. | G06Q 30/02 |
| | | | | | 709/204 |
| 2013/0031475 | A1* | 1/2013 | Maor | .................... | G06Q 10/10 |
| | | | | | 715/706 |
| 2014/0164300 | A1* | 6/2014 | Mishra | .................. | G06Q 50/01 |
| | | | | | 706/38 |
| 2014/0379796 | A1* | 12/2014 | Altaf | ...................... | H04L 63/10 |
| | | | | | 709/204 |
| 2015/0067879 | A1* | 3/2015 | Appalabattula | ........ | G06Q 50/01 |
| | | | | | 726/26 |
| 2016/0004778 | A1* | 1/2016 | Finder | ................ | G06F 16/9535 |
| | | | | | 707/722 |
| 2016/0253710 | A1* | 9/2016 | Publicover | ............. | H04W 4/21 |
| | | | | | 705/14.66 |
| 2017/0353423 | A1* | 12/2017 | Morrison | ............... | H04L 51/32 |

* cited by examiner

| Non-Bridge(WHEN NOT A BRIDGE) |

 00 IS A MAIN SUBJECT WHO INTENDS TO EXPRESS ONESELF TO MANAGE ONE'S SYMBOLISM AND MAKE VARIOUS AFFECTION RELATIONSHIPS

| HAVE LIGHTNING BLIND DATE (700) | PROPOSE TO HAVE A MEAL, DRINK, PLAY, CULTURE AND THE LIKE TOGETHER |
| INTRODUCTION REQUEST (705) | REQUEST FRIEND OR BRIDGE FOR DIRECT INTRODUCTION |
| WRITE MESSAGE (710) | SEND MESSAGE TO APPROACHABLE PEOPLE IN NETWORK |
| SHOW INTEREST (715) | SHOW INTEREST TO APPROACHABLE PEOPLE IN NETWORK |
| ROLE CHANGING (720) | BECOMING A SOLO BRIDGE (MEDIATOR ROLE) |
| INTRODUCE FRIEND (725) | INTRODUCE SOLO FRIEND TO SOLO FRIEND |

| COMMON FUNCTION |

| INTERVIEWING | REPLY TO OFFICIAL QUESTIONS AND BRIDGE'S QUESTION (IN THE FORM OF POSTED COMMENTS) |
| RECENT POSTINGS | PERSONALLY PREPARING POSTINGS (WRITINGS, PHOTOS, IMAGES) |
| COMMENTS, LIKE | GENERAL COMMUNITY FUNCTION |

| Bridge(WHEN A BRIDGE) |

 BRIDGE IS A MAIN SUBJECT WHO DOES NOT NEED AN AFFECTION RELATIONSHIP BUT AIMS AT INTRODUCING AND MEDIATING FOR FRIENDS

| + FUNCTIONS OF OO: | LIGHTNING BLIND DATE, WRITING MESSAGE, INTRODUCTION REQUEST FUNCTION ARE THE SAME |
| ROLE CHANGING(BR → Solff) | BEING CONVERTED FROM A BRIDGE TO 00 (NETWORK DISCONNECTED) |

(+)

| CUPID'S ARROW (750) | INTRODUCING TWO PEOPLE FORMING SOCIAL NETWORK |
| INTRODUCING (755) | INTRODUCING A CERTAIN PERSON TO ARBITRARY PERSON |
| BRIDGE TEMPORARY SHUT-DOWN (760) | TEMPORARILY SHUTTING DOWN BRIDGE ROLE (ONE DAY, THREE DAYS, A WEEK~) |
| NETWORK INFORMATION VIEWING (765) | VIEWING INFORMATION BEING EXCHANGED VIA ME |
| INTERVIEW QUESTIONING (770) | QUESTIONING TO ALL (QUESTIONAIRE, PHSYCHOLOGICAL TEST ETC.) |
| + ? | |

Fig.7

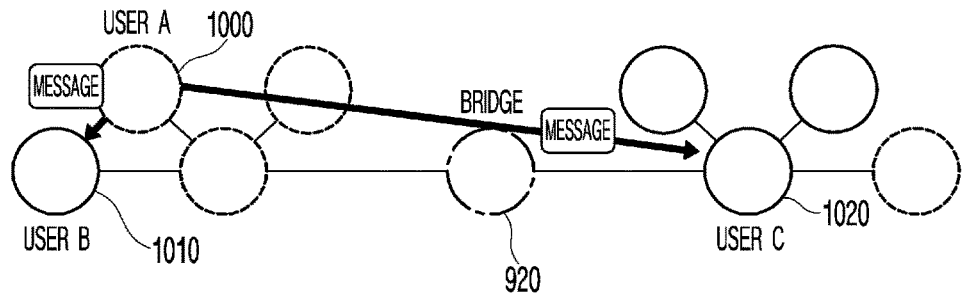
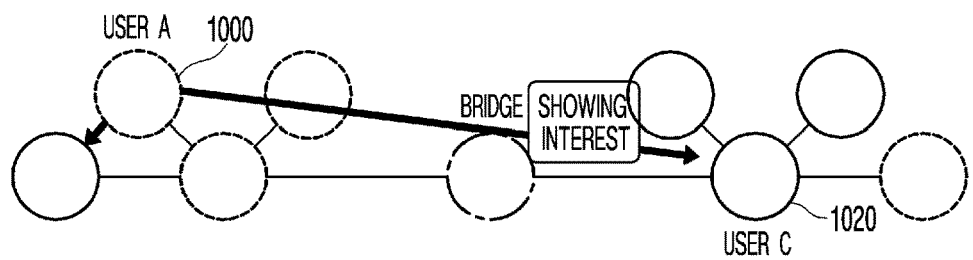
Fig.10
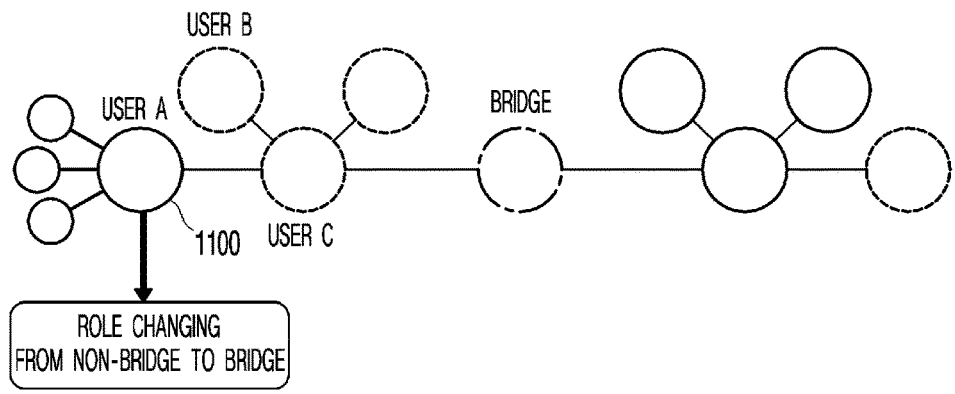
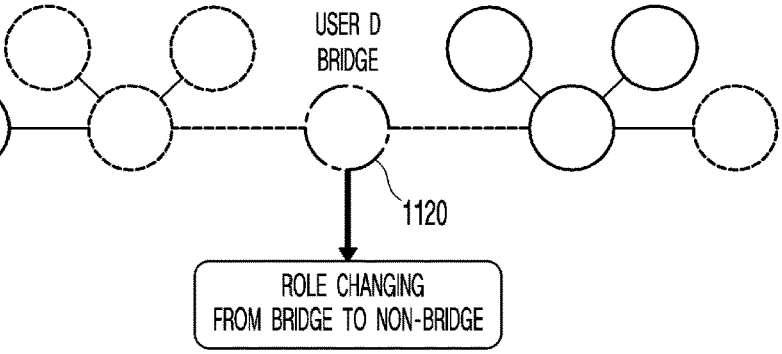
Fig.11

METHOD AND APPARATUS FOR VARIABLE SOCIAL NETWORK SERVICE

CROSS-REFERENCE TO RELATED APPLICATION

This application is the U.S. national stage application of International Patent Application No. PCT/KR2015/013955, filed Dec. 18, 2015, which claims priority to Korean Application No. 10-2015-0026279, filed Feb. 25, 2015, the disclosures of each of which are incorporated herein by reference in their entirety.

BACKGROUND OF THE INVENTION

Field of the Invention

Apparatuses and methods consistent with the present disclosure relate to a variable social network service method and apparatus, and more particularly, to a method and apparatus for providing a social network that varies according to a user's setting.

Description of the Related Art

Social networking service (SNS) grew rapidly over the last few years, and nowadays more than 2 billion people are using it. Almost everyone who uses a computer has at least one SNS account and spends a lot of time using SNS every day.

SNS may be defined as a web application for creating semi-open profiles, communication with users' friends or acquaintances, and online communities of users. SNS is based on a social relationship with users. Most people subscribes to SNS to share information, and keep in touch with people they know. The biggest characteristic of SNS is that it provides a service for finding friends so that a user can find acquaintances and friends and make their own online communities.

Most SNS users share much parts of their personal information in their social network spaces. These information include various information such as demographic-based data such as gender, age, and level of education, and contact information, comments, images, videos and the like. Other users inadvertently disclose their information. Further, SNS users tend to show high confidence in other users in the same SNS. Therefore, SNS users tend to easily accept requests to make friends sent by other users in that SNS and easily believe the items sent by these friends. Due to such openness of SNS information, it is important to determine the service scope of the social network to minimize users' repulsion when social network service providers perform social network services.

SUMMARY OF THE INVENTION

One aspect of the present disclosure provides a variable social network service method.

Another aspect of the present disclosure provides a variable social network service apparatus.

In one aspect of the present disclosure, there is provided a variable social network service method including receiving, by a variable social network service apparatus, information on whether or not a user serves as a bridge from a user apparatus of the user; and determining, by the variable social network service apparatus, whether or not to expand a social network based on the user based on the information on whether or not the user serves as the bridge, wherein the variable social network service apparatus determines whether or not social networking is possible between a first network subject of the user and a second network subject of the user depending on whether or not the user serves as the bridge.

Meanwhile, the first network subject may be another user having a direct social network relationship with the user, and the second network subject may be another user having a direct social network relationship with the first network subject.

Further, the variable social network service apparatus may set such that social networking is possible between the first network subject and the second network subject if the user serves as the bridge, and set such that social networking is only possible among the first network subjects if the user does not serve as the bridge.

Further, the variable social network service apparatus may allocate to the user a function capable of arranging a couple matching among other users in the social network if the user serves as the bridge.

Further, the variable social network service apparatus may reduce the social network expanded due to the user serving as the bridge if the user is converted from the bridge to a non-bridge.

In another aspect of the present disclosure, there is provided a processor configured to receive information on whether or not a user serves as a bridge from a user apparatus of the user, determine whether or not to expand a social network based on the user based on the information on whether or not the user serves as the bridge, and determine whether or not social networking is possible between a first network subject of the user and a second network subject of the user depending on whether or not the user serves as the bridge.

Meanwhile, the first network subject may be another user having a direct social network relationship with the user, and the second network subject may be another user having a direct social network relationship with the first network subject.

Further, the processor may be configured to set such that social networking is possible between the first network subject and the second network subject if the user serves as the bridge, and set such that social networking is only possible among the first network subjects if the user does not serve as the bridge.

Further, the processor may be configured to allocate to the user a function capable of arranging a couple matching among other users in the social network if the user serves as the bridge.

Further, the processor may be configured to reduce the social network expanded due to the user serving as the bridge if the user is converted from the bridge to a non-bridge.

According to one aspect of the present disclosure aforementioned, a user may determine whether or not to expand a social network as the scope of the social network is expanded or reduced by user selection. Further, the user may operate the social network according to the user's purposes as the social network of another user with whom the user formed a social network may be determined according to the social network group setting of other users of the user.

BRIEF DESCRIPTION OF THE DRAWING FIGURES

The above and/or other aspects of the present invention will be more apparent by describing certain embodiments of the present disclosure with reference to the accompanying drawings, in which:

FIG. 7 illustrates functions that are possible in a variable social network service according to whether or not the role of a bridge is performed according to an embodiment of the present disclosure.

FIG. 10 are views illustrating the concept of a message writing function and a showing interest function according to an embodiment of the present disclosure.

FIG. 11 are views illustrating the concept of a role changing function according to an embodiment of the present disclosure.

DESCRIPTION OF THE PREFERRED EMBODIMENT

Figure 1:
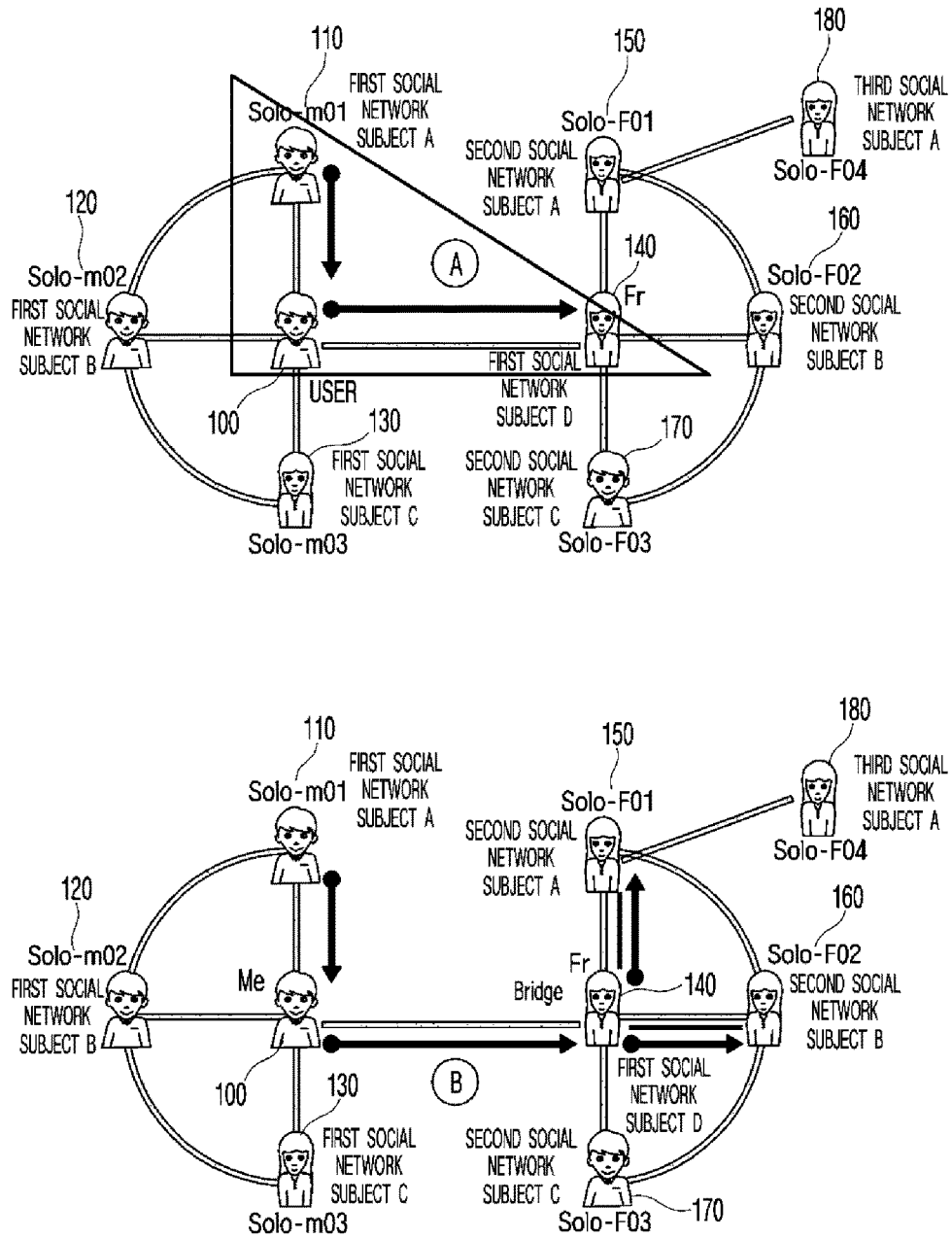
FIG. 1 are views illustrating the concept of a variable social network service method according to an embodiment of the present disclosure.

The following detailed description is accompanied by drawings illustrating certain embodiments that may be implemented by the present disclosure. These embodiments will be described in detail such that they could be fully implemented by one skilled in the related art. It should be understood that the various embodiments of the present disclosure are different from one another but they need not be mutually exclusive to one another. For example, a specific shape, structure and feature disclosed herein may be realized in another embodiment without going beyond the spirit and scope of the present disclosure with respect to one embodiment. Further, it should be understood that a position or arrangement of an individual component within each embodiment disclosed may be modified without going beyond the spirit and scope of the present disclosure. Therefore, the following detailed description is not to be construed as a limited meaning, but the scope of the present disclosure, if described appropriately, is limited by the claims attached along with all scopes equivalent to those asserted by the claims. Like reference numerals indicate equivalent or like functions throughout the various aspects.

Hereinafter, preferable embodiments of the present disclosure will be explained in detail with reference to the drawings.

In a conventional SNS service, friends were made by mutual approval by acquaintances, thereby obtaining relationships of friends, mutual information exchange and information communication. Further, in a closed type network, a method for communicating with people that are in a same group and sharing information are already a common method. In a conventional SNS service, a user could visit an SNS of a friend that the user had made friends with, and view the friends of that friend or select a friends list of that friend to visit friends of those selected people, thereby infinitely expanding the social network. Especially, when the user make friends with a certain person, the user and friends of that certain person know the existence of each other and can see the postings of each other even though the user knows the existence of that certain person but not the existence of the friends of that certain person, and vice versa. Such expansiveness of the social network may generate a degree of fatigue to the user. That is because the existence of the user and information of the user are exposed to unwanted people and people that the user doesn't know.

When a social network service is provided, the scope of social networking needs to be adjusted by the user. If the scope of social networking is adjusted by the user, the fatigue caused by sharing SNS information may be reduced, and the user may utilize the social network service in accordance with various purposes of the user.

Hereinafter, there is disclosed a social network service method and apparatus that is capable of reducing the fatigue caused by sharing SNS information and that may be used in accordance with various purposes of a user.

In a variable social network service method according to an embodiment of the present disclosure, expansion and reduction of a relationship may be performed adaptively according to user selection. The user may set the scope of the social networking function differently for a first social network subject of the user with which social networking is performed directly, a second social network subject of the user, and a third social network subject of the user. The second social network subject may mean other users that directly perform social networking with the first social network subject, and the third social network subject may mean other users that directly perform social networking with the second social network subject. When such a method is used, unlimited expansion of the social network may be prevented by user selection. When the user sets the social network to a basic setting scope, social networking may be permitted only among the first social network subjects of the user. When the user sets the social network to an expansive setting scope, the user may serve as a bridge, permitting social networking between the second social network subjects and the first social network subjects. Such a social networking method according to the embodiment of the present disclosure will be explained hereinafter.

Further, in a variable social network service method according to an embodiment of the present disclosure, a user may group the first social network subjects in multiple groups according to social relationships. More specifically, the user may classify certain first social network subjects to group 'A', certain second social network subjects to group 'GA'. In the variable social network service method according to an embodiment of the present disclosure, the scope of the social networking function between the user and other performers performing the social networking may variably change according to the social network group classification regarding the other users of the user.

Hereinafter, a specific variable social network service method will be disclosed. Hereinafter, for convenience of explanation, the explanation will be focused on couple matching, but the variable social network service method according to an embodiment of the present disclosure may be used for various purposes other than couple matching.

FIG. 1 are views illustrating the concept of a variable social network service method according to an embodiment of the present disclosure.

At the top of FIG. 1, a social network having a basic scope in the variable social network service method is disclosed.

To explain the social network at the top of FIG. 1 based on the user 100, there may be four first social network subjects around the user 100. The four first social network subjects may include a first social network subject A 110, a first social network subject B 120, a first social network subject C 130, and a first social network subject D 140.

In the case where the user 100 set the scope of the social network to a basic setting scope, a certain first social network subject of the user 100 may form a network with another first social network subject. For example, the first social network subject A 110 may form a social network with the first social network subject D 140 and perform social networking. Based on the first social network subject A 110, the first social network subject D 140 may be a second network subject of the first social network subject A 110 (a friend of a friend).

At the bottom of FIG. 1, a social network having an expansive scope in the variable social network service method is disclosed.

To explain the social network at the bottom of FIG. 1 based on the user 100, there may be four first social network subjects around the user 100. The four first social network subjects may include a first social network subject A 110, a first social network subject B 120, a first social network subject C 130, and a first social network subject D 140.

Further, based on the user, there may exist a second social network subject A 150, a second social network subject B 160, and a second social network subject C 170 having social networking relationships with the first social network subject D 140.

According to an embodiment of the present disclosure, when the first social network subject D 140 serves as a bridge, other first social network subjects of the user may perform social networking with the second social network subjects of the user through the first social network subject D 140 that serves as a bridge. The second social network subjects of the user may be the first social network subjects of the first social network subject D 140. Further, based on the first social network subjects A 110, B 120, and C 130, the second social network subjects of the user may be third social network subjects of the first social network subjects A 110, B 120, and C 130 (that is, a friend of a friend of a friend).

To explain based on the user 100, for example, in the case where the first social network subject D 140 serves as a bridge, a second social network subject A 150 and a second social network subject B 160 may perform social networking with the first social network subject A 110 through the first social network subject D 140.

The bridge may play the role of placing a bridge in a social network. That is, in the case where a certain user is serving as the bridge, the social network may be expanded based on that certain user serving as the bridge.

That is, by selecting whether or not the certain user will serve as the bridge, whether or not to expand the social network of another user (first social network subject) connected to the certain user may be determined. If the user selects to serve as a bridge, the social network may be expanded, but on the contrary, if the user does not select to serve as the bridge, the social network may be reduced.

In the case where the scope of the social network is adjusted according to the user's purpose, the effect of the social network may differ according to the set scope of the social network. If there is a bridge (the person who opens) among the first social network subjects of the user, due to the bridge, the social network may be expanded to the second social network subjects based on the user. Further, depending on whether or not the user serves directly as a bridge, whether or not a social networking is possible between a second social network subject of the user and a first social network subject of the user may be determined.

For example, if the user is a solo, the user may not serve as a bridge in order to limit the social networking between the first social network subjects and the second social network subjects. On the contrary, if the user is not a solo, the user may serve as a bridge in order to arrange a social networking between the first social network subjects and the second social network subjects.

Figure 2:
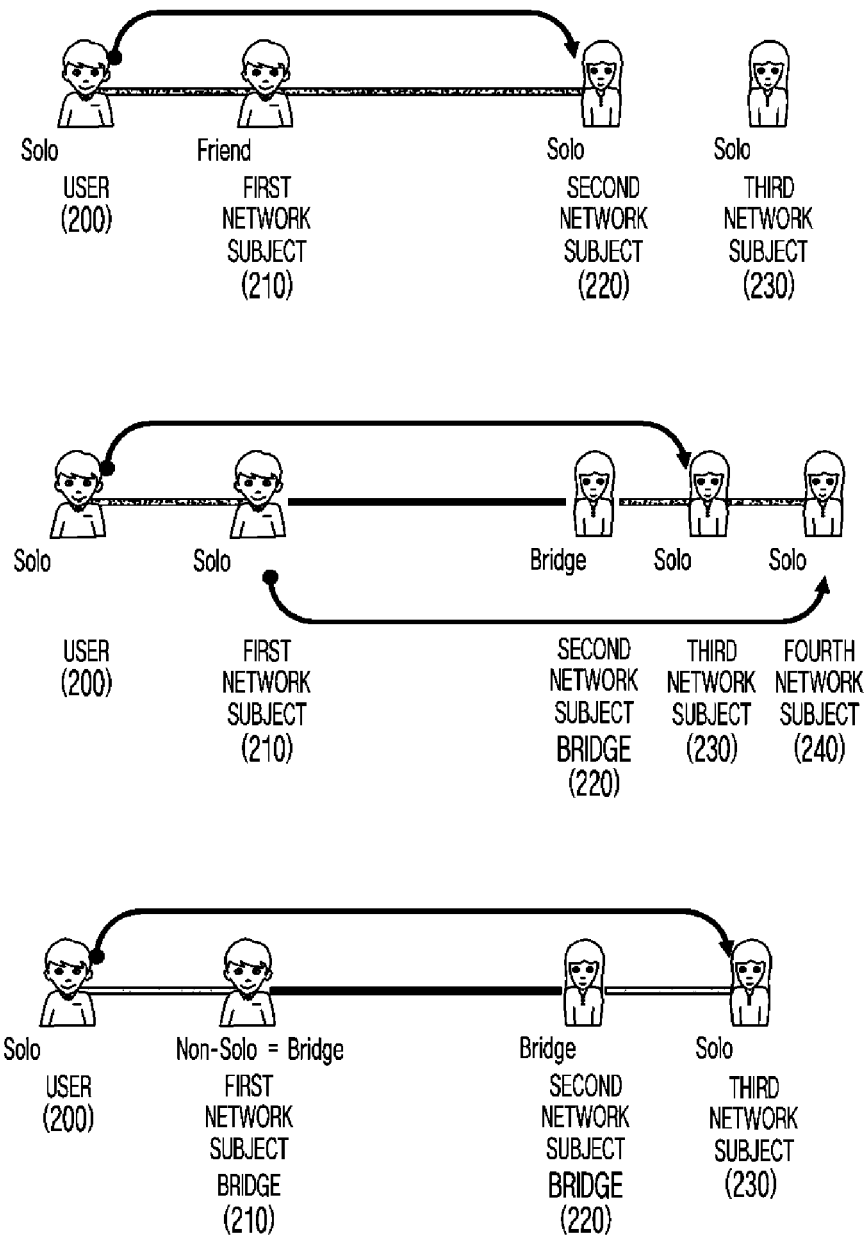
FIG. 2 are views illustrating the concept of a social networking service according to an embodiment of the present disclosure.

FIG. 2 are views illustrating the concept of a social networking service according to an embodiment of the present disclosure.

FIG. 2 illustrates a social network having a basic scope and social networks having an expansive scope. FIG. 2 illustrates the social networks based on the user.

At the top of FIG. 2, the social network having a basic scope is disclosed.

In the social network having a basic scope, the user 200 may form a social network with a first network subject 210 and a second network subject 220. In the social network having a basic scope, there may be no first network subject 210 or second network subject 220 that serves as a bridge. In such a case, the user 200 may form a social network up until the friend (second social network subject 220) of the friend (first social network subject 210), and perform social networking.

If there is no bridge among the first network subject 210 and the second network subject 220 of the user 200, the social network cannot be expanded. The reason why expansion is permitted only up until the first network subject 210 and the second network subject 220 when there is no bridge is because the role of the bridge is relatively important, and even when a certain user does not directly need a social network for couple matching, it is important to make the user serve as a bridge and participate in the social networking. That is, even when the certain user is a couple and thus does not need a social network for couple matching, the certain user still has the role of a bridge, and thus the membership activities of the certain user may be maintained. When there is a bridge in a user's relationship network, the social network may be expanded. Whether or not to serve as a bridge may be determined depending the certain user's setting regardless of whether the certain user is a couple or a solo.

At the middle of FIG. 2, a social network having an expansive scope is disclosed.

In the social network having an expansive scope, one of the second network subjects of the user 200 may serve as a bridge. In the case where one of the second network subjects serves as a bridge 220, the social network may be expanded up until a third network subject 230 based on the user 200. Not a mutual necessary and sufficient condition, but only a sufficient condition needs to be provided for the bridge 220. If the user 200 is a solo and at least one of the second network subjects serves as the bridge 220, the user may approach up until the third network subject 230.

At the bottom of FIG. 2, a social network having an expansive scope is disclosed.

In the social network having an expansive scope, one of the first network subjects 210 of the user 200 may serve as a bridge. In the case where one of the first network subjects 210 serves as a bridge, the network may be expanded up until the third network subject 230 based on the user. Two people that form a bridge relationship may not be able to perform a couple matching function through a social network for couple matching. That is, a certain user being a bridge may mean playing the role of providing only a social network to solos in the relationship network based on the certain user, without performing couple matching utilizing the social network.

For example, in the case where a certain user has recently become a couple and is thus no longer a solo, the certain user may only serve as a bridge. Whether or not the certain user serves as a bridge may play an important role in forming a mutual relationship network of a social network. Further, the certain user may serve as a bridge, thereby continuously using the social network service.

Figure 3:
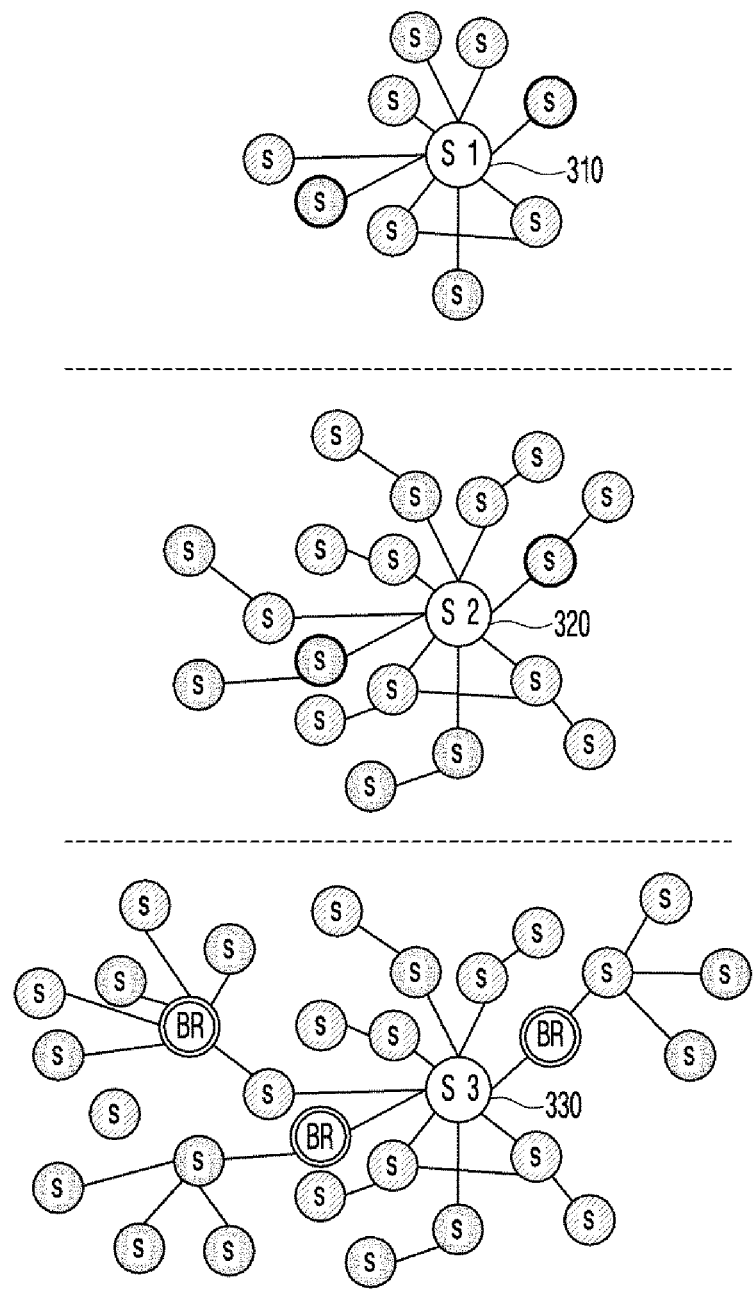
FIG. 3 are views illustrating the concept of expansion of the social network according to an embodiment of the present disclosure.

FIG. 3 are views illustrating the concept of expansion of a social network according to an embodiment of the present disclosure.

FIG. 3 discloses expansion of a social network according to settings.

For convenience of explanation, assume that users S1, S2 and S3 disclosed in FIG. 3 are male. Further, a blue S may indicate another user in the social network who is male, and a pink S may indicate another user in the social network who is female.

The left side of FIG. 3 is a social network that is expandable up until a first network subject based on the user S1 310. That is, in a social network that is expandable up until the first network subjects, only friend relationships may exist. A friend may be introduced through a friend, but the social network is restrictive and limited. The user S1 310 may perform social networking with three people of the opposite sex.

The middle of FIG. 3 is a social network expandable up until a second network subject (for example, a friend of a friend) based on the user S2 320. That is, in the social network that is expandable up until the second network subject, social networking may be possible up until a friend of a friend. In the social network that is expandable up until the second network subjects, common approaching behavior such as blind dates mostly occur. Especially, if there are a lot of non-solos who have a lot of people of the opposite sex around them, the probability of being introduced with people of the opposite sex may increase. In a social network that is expandable up until the second network subjects, a male user S2 320 may perform social networking with seven people of the opposite sex. Compared to the social network at the left side of FIG. 3, social networking may be possible with four additional people of the opposite sex based on the expanded social network.

The right side of FIG. 3 is a social network that is expandable up until a third network subject (for example, a friend of a friend of a friend) based on the user S3 320. That is, if there exists a bridge, the social network may be expanded up until the third network subjects.

The third network subject may not be a complete stranger but someone in the boundary of maintaining a certain degree of trust of acquaintance. Since there is less trust in the third network subjects, there is less pressure as well, and thus there may be less pressure of approach caused by expansion of the network. A bridge is variable, and thus depending on creation and extinction of a bridge, the social network may change variably. If there exists three bridges among the first network subjects and second network subjects based on the user S3 330, the user S3 330 may form social networks with a total of thirteen people of the opposite sex. That is, compared to the social network in the middle of FIG. 3, social networking may be possible with six additional people of the opposite sex based on the expanded social network.

That is, the social network may be expanded according to settings by the user and/or another user, and social networking with additional people of the opposite sex may be possible according to the expansion of the social network.

Figure 4:
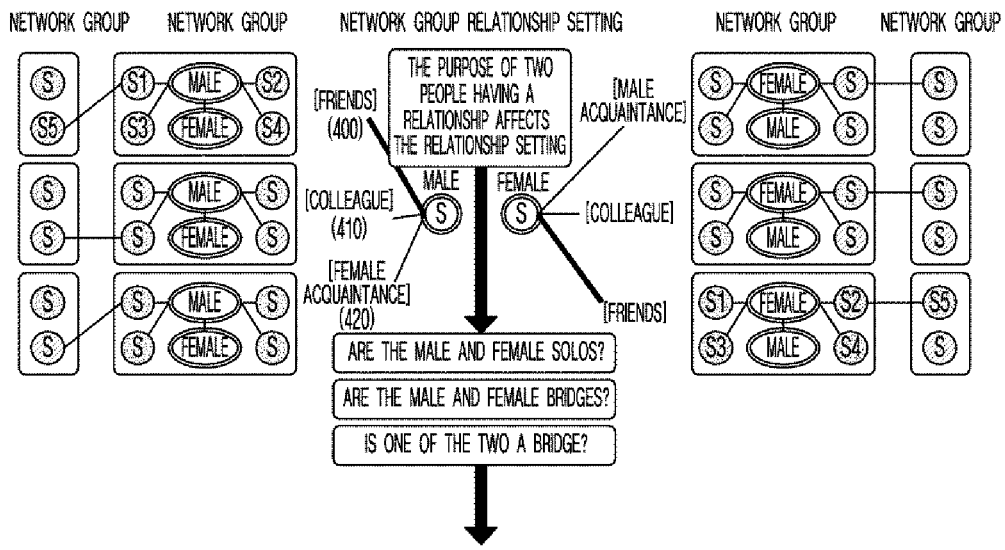
FIG. 4 is a view illustrating the concept of a social network group setting method according to an embodiment of the present disclosure.

FIG. 4 is a view illustrating the concept of a social network group setting method according to an embodiment of the present disclosure.

FIG. 4 discloses changes of a social network according to a user's social network group setting.

Referring to FIG. 4, the user may classify first network subjects into various groups. For example, the user may classify the first network subjects into a friends group 440, a colleague group 410, and a female acquaintance group 420.

Depending on the classification of social network groups of the user, the subject that a first network subject may access through the social network may differ. For example, if the first network subject is classified in the friends group 400 among the social network groups, the certain first network subject of the user may form a social network with other first network subjects of the user included in the friends group 400. Further, if one of the other first network subjects of the user included in the friends group 400 is a bridge, the certain first network subject of the user may expand the social network up until the second network subjects of the user.

To explain based on the couple matching service, when a male and a female made friends, they may be (1) friends, (2) colleagues, or (3) acquaintances. Here, for these two people, the purpose of making a friend relationship may be preferentially important, or the possibility of exchanging networks between each other after becoming friends may be important. A social network group may be set in consideration of these two factors. Depending on the grouping of the social network group, there may be a lot of possibility of exposure to the opposite sex, or on the contrary, the possibility of exposure may be reduced. That is, the possibility of exposure to the opposite sex may differ depending on the setting of the network group. For example, when a male is classified in a friends group of a female, or when a female is classified in a friends group of a male, the possibility of meeting people of the opposite sex may increase.

In the case where both a male and a female serve as a bridge, one can be grouped in a group where there are a lot of solos through the counterparts' network than one's own network. That is, when serving as a bridge, the user may group another user that he/she is connected to in order to increase the possibility of couple matching of the other user rather than the possibility of couple matching of oneself.

Figure 5:
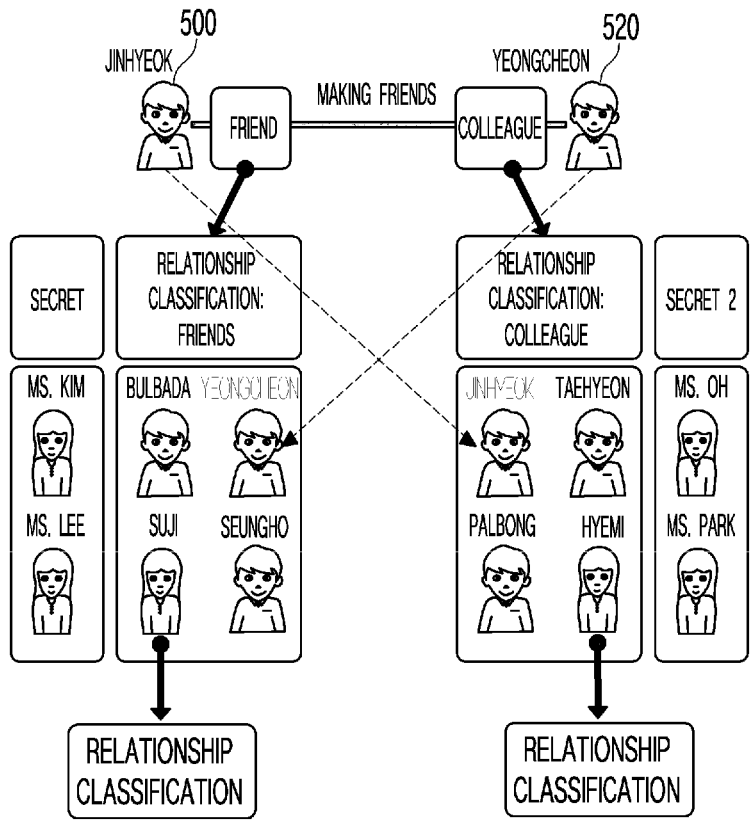
FIG. 5 illustrates a specific variable social network service method according to an embodiment of the present disclosure.

FIG. 5 illustrates a specific variable social network service method according to an embodiment of the present disclosure.

FIG. 5 illustrates a specific variable social network service method that depends on social network grouping and whether or not one serves as a bridge.

Referring to FIG. 5, when forming a relationship with another user through a social network, the user may subdivide and register the other user in a certain social network group (for example, alumni, high school friends, friends, college friends etc.).

For example, when the user sets another user in a social network group 'friends', the other user may form a social network with other users in that social network group 'friends'. For example, when JinHyeok 500 classifies YeongCheon 520 in a social network group 'friends', YeongCheon 520 may form a social network with SuJi. When YeongCheon 520 classifies JinHyeok 500 in a social network group 'colleagues', a social network may be formed between JinHyeok 500 and HyeMi.

If JinHyeok 500 is not a bridge, TaeHyeon may know about JinHyeok 500 but he may not know about other users having a social network with JinHyeok 500. That is, TaeHyeon doesn't know the existence of SuJi who formed a social network with JinHyeok 500. On the contrary, if JinHyeok 500 is a bridge, it may have an effect on TaeHyeon. When JinHyeok 500 becomes a bridge, TaeHyeon may know the existence of SuJi, and form a social network with SuJi. SuJi may also know about PalBong and TaeHyeon through JinHyeok 500.

Hereinafter, FIG. 6 discloses a case where a social network group has been changed by the user.

Figure 6:
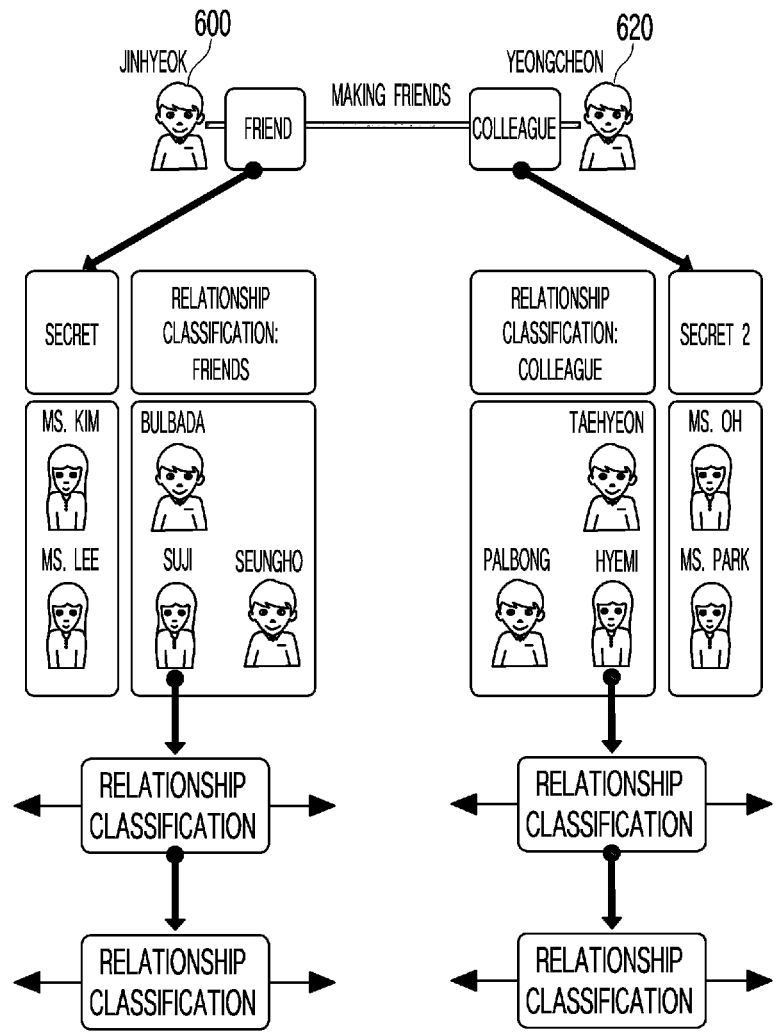
FIG. 6 is a specific variable social network service method according to an embodiment of the present disclosure.

FIG. 6 discloses a specific variable social network service method according to an embodiment of the present disclosure.

FIG. 6 discloses a variable social network service that depends on social network grouping and whether or not one serves as a bridge.

JinHyeok 600 may change the social network group of YeongCheon 620 from 'friends' to 'secret'. When JinHyeok 600 changes the social network group of YeongCheon 620, the users with whom YeongCheon 620 may form a social network may change. For example, YeongCheon 620 may form a social network group with Ms. Kim and Ms. Lee. Likewise, when YeongCheon 620 or JinHyeok 600 serves as a bridge, Ms. Kim and Ms. Lee may know about the existence of Ms. Oh and Ms. Park.

SeungHo may form a network group with SuJi and Bulbada who are in the same social network group 'friends' as JinHyeok 600, but may not form a network group with Ms. Kim and Ms. Lee who are in another social group 'secret'. That is, approachability may differ depending on the user's classification of the social network group.

In order to operate the variable social network service according to an embodiment of the present disclosure, the following principles may apply.

Becoming a bridge means that he/she is not a solo, or need not be a solo, and when set as a bridge, the authorities, functions and benefits that a solo can have may be waived. Further, a change from a solo to a bridge and vice versa is possible. However, there may be limitations to the number of changes possible between a solo and a bridge. The social network groups may be classified according to the user's convenience. Changes in the social network groups may be performed only in a limited number of times (for example, twice a day, three times a week, four times a month).

FIG. 7 illustrates functions that are possible in a variable social network service according to whether or not one is serving as a bridge according to an embodiment of the present disclosure.

FIG. 7 illustrates functions that may be performed when the user serves as a bridge (when the user is a solo) and when the user serves as a bridge, respectively.

Referring to FIG. 7, when the user is a solo, a lightning blind date function 700, an introduction request function 705, a message writing function 710, a showing interest function 715, a role changing function 720, a friend introduction function 725 and the like may be performed.

The lightning blind date function 700 may be used when the user wants to propose a meal, play, cultural activity and the like to another user with whom a social network is formed.

The introduction request function 705 may be used when the user wants to request another user with whom a social network is formed (for example, another user who serves as a bridge) for an introduction.

The message writing function 710 may be used when the user wants to write a message to another user with whom a social network is formed.

The showing interest function 715 may be used when the user wants to show that he/she is interested in another user with whom a social network is formed.

The role changing function 720 may be used by the user to change his/her role from a solo to a bridge.

The friend introduction function 725 may be used by the user to introduce his/her acquaintance to another user with whom a social network is formed.

When the user is a bridge, the lightning blind date function 700, the message writing function 710, the introduction request function 705, and the role changing function 720 may be used in the same manner as when the user is a solo.

When the user is a bridge, a cupid's arrow function 750, an introducing function 755, a bridge temporary shut down function 760, a network information viewing function 765, an interview questioning function 770 and the like may be used.

The cupid's arrow function 750 may be used when the user serving as a bridge wants to propose a blind date to two users with whom a social network is formed.

The introducing function 755 may be used when the user serving as a bridge wants to introduce his/her acquaintance to a certain user with whom a social network is formed.

The bridge temporary shut down function 760 may be realized when the user serving as a bridge wants to stop the role as a bridge for a certain period of time.

The network information viewing function 765 may be realized when the user serving as a bridge wants to view the information being exchanged through the bridge (oneself).

The interview questioning function 770 may be realized when the user serving as a bridge wants to throw a common question such as a questionnaire, psychological test and the like to another user with whom a social network is formed.

Regardless of whether the user is a solo or a bridge, the user may commonly use the recent condition function of uploading a piece of writing, a photo, a video and the like that the user prepared by himself/herself, the function of writing a comment and pressing 'Like' under a piece of writing, a photo, a video and the like posted by another person, and pressing 'Like' function and the like.

Figure 8:
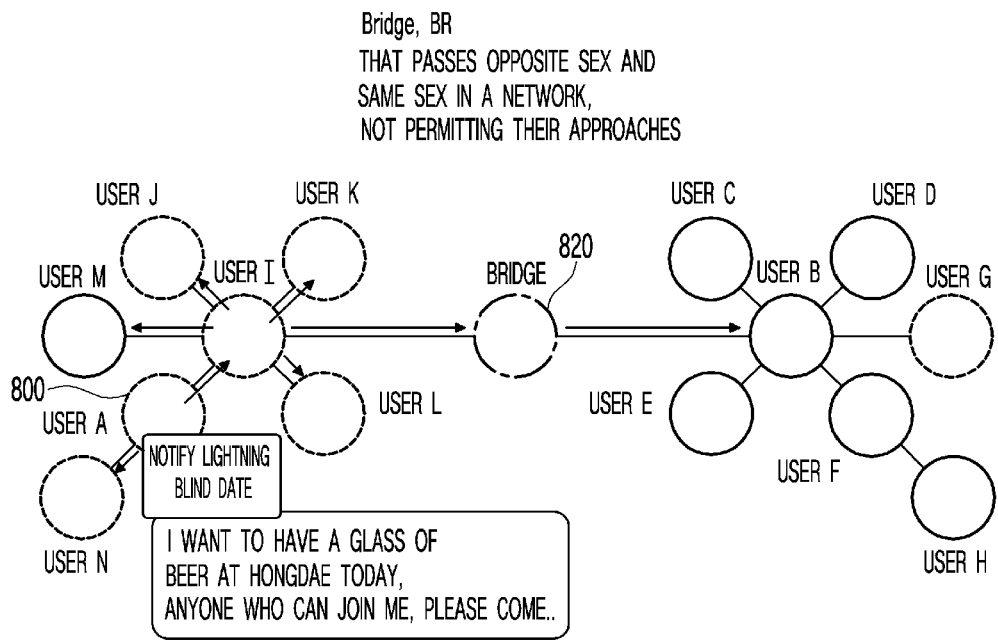
FIG. 8 is a view illustrating the concept of a lightning blind date function according to an embodiment of the present disclosure.

FIG. 8 is a view illustrating the concept of the lightning blind date function according to an embodiment of the present disclosure.

Referring to FIG. 8, the user A 800 may use the lightning blind date function to propose a lightning blind date to users in a social network.

The lightning blind date proposal made by the user A 800 may be transmitted to a user B 840 through a bridge 820. The user B 840 may transmit a lightning proposal message to users C to G with whom the user B 840 formed a social network. Further, the user B 840 may request the bridge for introduction of the user A 800. The bridge 820 may request the user B 840 for information on the user A 800.

Figure 9:
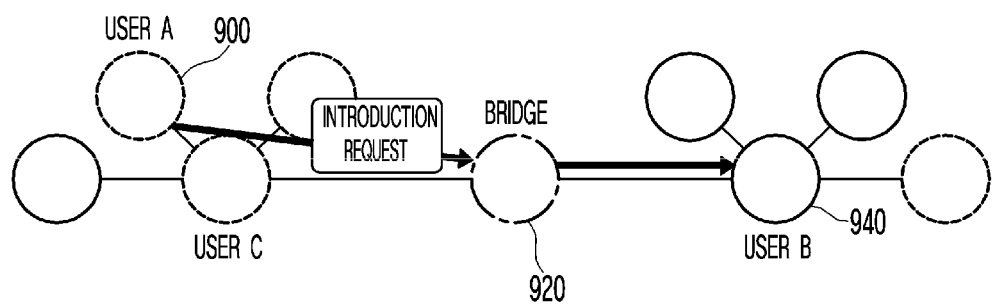
FIG. 9 is a view illustrating the concept an introduction request function according to an embodiment of the present disclosure.

FIG. 9 is a view illustrating the concept of an introduction request function according to an embodiment of the present disclosure.

Referring to FIG. 9, the user A 900 may use the introduction request function to request the bridge 920 for information on the user B 940.

The bridge 920 may obtain information on the user A 900, or request the user C for information on the user A 900. In the case where the bridge 920 decided to introduce the user B 940 to the user A 900, the bridge 920 may introduce the user A 900 and the user B 940 to each other through the cupid's arrow function, the introducing function and the like that will be explained hereinafter. On the contrary, in the case where the bridge 920 decided not to introduce the user B 940 to the user A 900, the bridge 920 may refuse to introduce, and may transmit information to the user A 900 indicating that the introduction request has been refused.

FIG. 10 are views illustrating the concept of the message writing function and the showing interest function according to an embodiment of the present disclosure.

Referring to FIG. 10, a user A 1000 may transmit a message to a user B 1010 who is a second network subject of the user A 1000. Further, the user A 1000 may send a message to a user C 1020 who is a third network subject of the user A 1000 through a bridge. The user B 1010 and the user C 1020 may also transmit a message to the user A 1000 as a reply to the message transmitted from the user A 1000.

In such a case, the bridge may receive information indicating that one message has been transmitted through the bridge. The bridge may be limited such that the bridge cannot know information on the user who sent the message and the user who received the message. The message may exist during a period of time set for disclosure, and then deleted after the period of time set for disclosure.

Further, the user A 1000 may show that he/she is interested in the user C 1020 using the showing interest function. When the showing interest function is used, the interest may be transmitted to the other user through various transmitting methods (emoticons, secret comments and the like).

FIG. 11 are views illustrating the concept of the role changing function according to an embodiment of the present disclosure.

Referring to FIG. 11, when the role changing function is being performed, a user A 1100 may be converted from a non-bridge state (or solo state) to a bridge state, or a bridge 1120 may be converted from a bridge state to a non-bridge state.

The top view of FIG. 11 illustrates a state where the user A 1100 is converted from a non-bridge state to a bridge state.

When the user A 1100 is converted to a bridge state, approaches by other users to the users with whom the user A 1100 form a social network may be permitted. For example, by a conversion to a bridge of the user A 1100, a user B and a user C may be changed to a state approachable to the users with whom the user A 1100 form a social network.

The bottom of FIG. 11 illustrates a state where a user D 1120 is converted from a bridge state to a non-bridge state.

The user D 1120 may be converted from a bridge state to a non-bridge state, in which case another user who used to be approachable may be converted to a non-approachable state.

Figure 12:
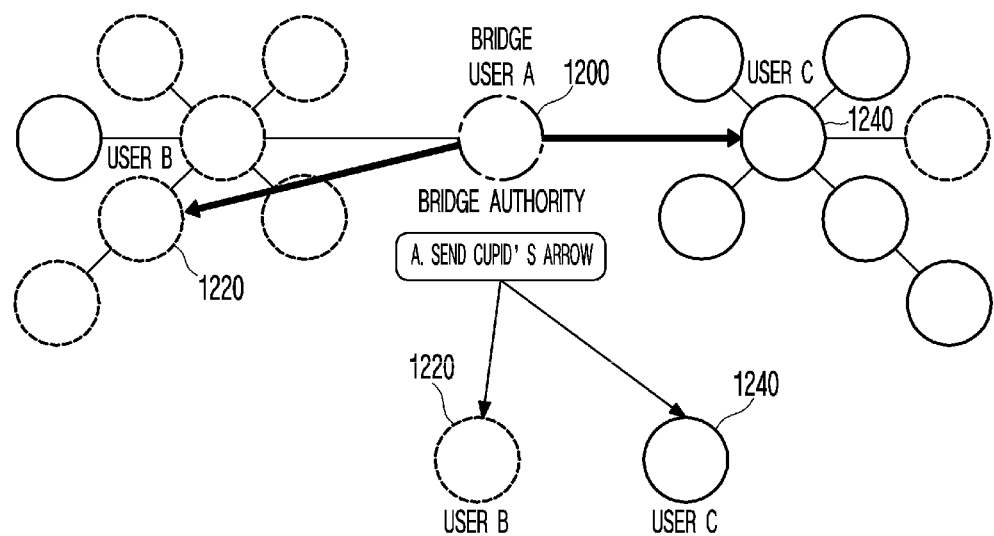
FIG. 12 is a view illustrating the concept of a cupid's arrow function according to an embodiment of the present disclosure.

FIG. 12 is view illustrating the concept of the cupid's arrow function according to an embodiment of the present disclosure.

FIG. 12 illustrates the cupid's arrow function.

Referring to FIG. 12, in the case where a user A 1200 who serves as a bridge uses the cupid's arrow function, the user A 1200 may attempt a couple matching of two users in a social network connectible by the bridge. In the case where a user B 1220 and a user C 1240 are subjects of the cupid's arrow function of the user A 1200, the user B 1220 and the user C 1240 may each respond by an accept, refuse, wait and the like regarding the cupid's arrow function. In the case where the user B 1220 and the user C 1240 both accepted, an additional information exchange may be performed between the user B 1220 and the user C 1240.

As a similar function, a user A 1200 serving as a bridge may use the introducing function. The user A 1200 may directly connect the user B 1220 and the user C 1240 through the introducing function. In the case where the user B 1220 and the user C 1240 accepted the request for introduction from the user A 1200, a chatting window between the user B 1220 and the user C 1240 may open, and the user B 1220 and the user C 1240 may perform chatting.

Not only that, in a variable social network service method according to an embodiment of the present disclosure, the bridge temporary shut-down function and the network information viewing function may be performed.

For example, a user A may temporarily shut down the role as a bridge through the bridge temporary shut-down function. The user A may temporarily shut down the role as a bridge through the bridge temporary shut-down function for a certain period of time (for example, one day, three days, one week and the like). In the case where the functions of the bridge are temporarily shut down, expansion of a social network through the bridge cannot be performed, and the message writing function, the showing interest function, the introduction request function and the like based on the bridge cannot be used.

Further, through the network information viewing function, the bridge may obtain information on communications that occurred through the bridge. For example, the number of messages that passed through the bridge, the number of interests shown through the bridge, the number of information inquiries made through the bridge and the like may be obtained. Further, the bridge may have an assessment index or assessment information according to the communications made through the bridge. The bridge may check the information on the activities performed as a bridge based on the assessment index and assessment information.

Figure 13:
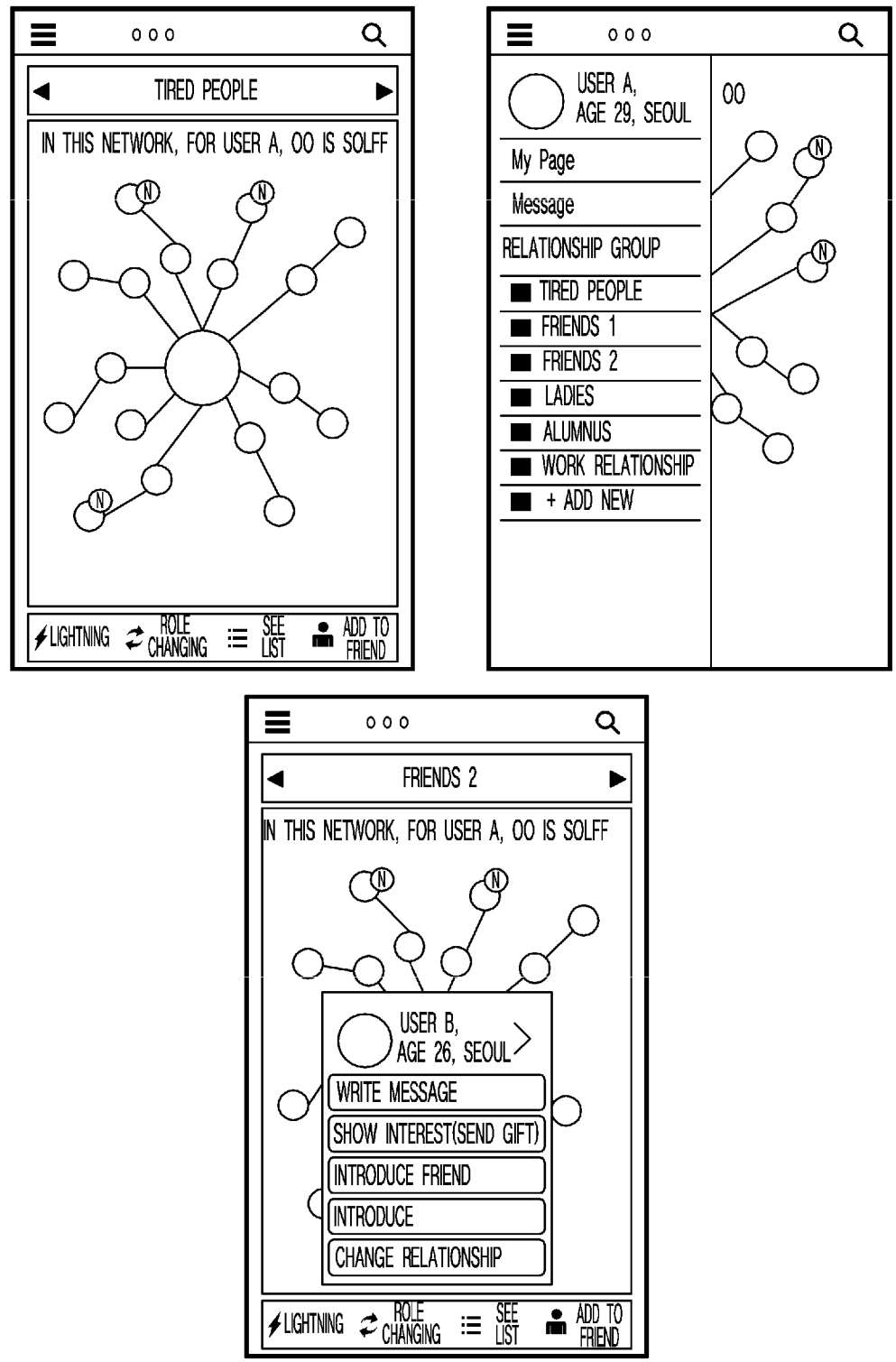
FIG. 13 are views illustrating screens providing a variable social network service according to an embodiment of the present disclosure.

FIG. 13 are views illustrating screens providing a variable social network service according to an embodiment of the present disclosure.

The left side of FIG. 13 is a view illustrating a user and the concept of a social network based on the user. The user may check the social network based on the user in the form of an image and a connection view.

The middle of FIG. 13 is a view illustrating a user menu. The user menu may include a user's My Page, the user's social network group setting, sub menus for the user's personal information setting and the like.

The right side of FIG. 13 is a view illustrating a menu for a user to form a relationship with another user through a social network. The user may approach another user who is approachable on the social network through the message writing function, showing interest function, friend introducing function, introducing function and the like.

Figure 14:
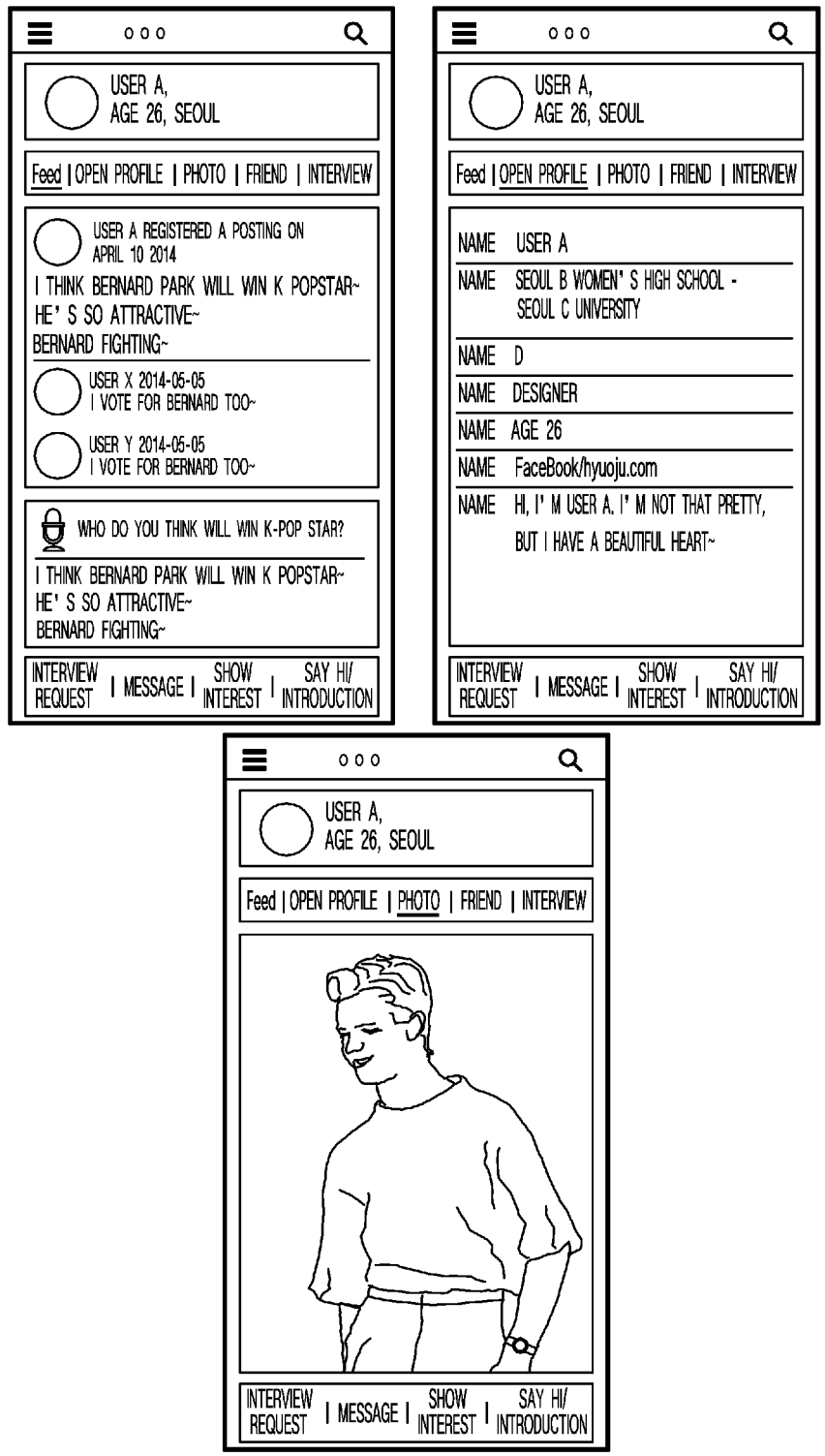
FIG. 14 is a view illustrating the concept of a My Page menu of a user according to an embodiment of the present disclosure.

FIG. 14 are view illustrating the concept of the My Page menu of a user according to an embodiment of the present disclosure.

The My Page menu may include a feed menu, an open profile menu, a photo menu, a friend menu and an interview menu as sub menus.

The left side of FIG. 14 is a screen for the feed menu, where a posting may be registered through a feedback function and feedback information on the registered posting may be obtained.

The middle of FIG. 14 is a screen for the open profile menu, where profile information of the user may be set and stored through the open profile menu.

The right side of FIG. 14 is a screen for the photo menu, where the user may upload an image through the photo menu.

Not only that, through a screen for the friends menu, the user may briefly check the user's first network subjects and information on the first network subjects. Through a screen for the interview menu, the user may post answers to the interview conducted by the bridge or answers to the interview provided by other users.

According to an embodiment of the present disclosure, a user may form a multiple social network according to a social network group setting.

When registering a friend who requested a friend relationship as a friend (or when registering another user who requested a direct social network as a first network subject), the friend may be classified in a folder (or a social network group) classified by the user. That is, the user may group a first network subject in a social network group classified by the user. The user may set each group in a telephone list, and classify the first network subjects in each of the multiple social network groups just as when classifying other registered people. Only the user can know the user's classification of the first network subjects, and the first network subjects can only know that a social network has been formed between them and the user (or that they have become friends with the user).

Further, the user may move the first network subjects included in a certain set social network group to another social network group to change the social network group of the first network subjects. The first network subjects may be grouped in only one social group set by the user.

The user may be included in each of at least one social network group set by the user. For example, in the case where the user has set a multiple social network groups, each of the multiple set social network groups may include the user. The user may be set as a bridge or a non-bridge by user selection in each of the multiple social network groups. For example, in a first social network group, the user may be set as a bridge and serve as the bridge, but in a second social network group, the user may be set as a non-bridge and serve as a non-bridge.

In a variable social network service method according to an embodiment of the present disclosure, the variable social networking function may be maximized based on the function of changing the setting of a bridge or non-bridge in a social network group of the user, and the function of grouping a first network subject in a certain social network group when registering a friend of the user (when registering a first network subject).

Figure 15:
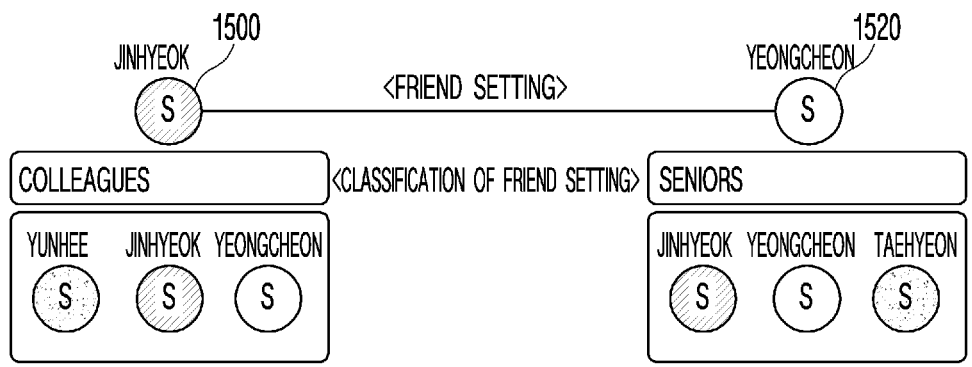
FIG. 15 is a view illustrating the concept of a multiple network setting method according to a social network group setting according to an embodiment of the present disclosure.

FIG. 15 is a view illustrating the concept of a multiple network setting method according to a social network group setting according to an embodiment of the present disclosure.

FIG. 15 illustrates a method where a user groups a first network subject in a certain social network group.

Referring to FIG. 15, JinHyeok 1500 may classify YeongCheon 1520 in a social network group 'colleagues 2'. The social network group 'colleagues 2' may include JinHyeok 1500, YeongCheon and YunHee. YeongCheon 1520 may classify JinHyeok 1500 in a social network group 'seniors'. The social network group 'seniors' may include JinHyeok 1500, YeongCheon 1520, and TaeHyeon.

JinHyeok 1500 cannot know about the social network group in which YeongCheon 1520 classified him, and JinHyeok 1500 may merely determine YeongCheon 1520 as a first network subject and perform social networking. JinHyeok 1500 may perform social networking with another first network subject of YeongCheon 1520 included in the social network group 'seniors' grouped by YeongCheon 1520. Here, the social network may be expanded or reduced depending on whether YeongCheon 1520 serves as a non-bridge (or solo) or a bridge in the social network group 'seniors'.

Likewise, YeongCheon 1520 cannot know about the social network group that JinHyeok 1500 classified him, and YeongCheon 1520 may determine JinHyeok 1500 as a first network subject and perform networking. YeongCheon 1520 may perform social networking with another first network subject of JinHyeok 1500 included in the social network group 'colleagues 2' grouped by JinHyeok 1500. Here, the social network may be expanded or reduced depending on whether JinHyeok 1500 serves as a non-bridge (or solo) or a bridge in the social network group 'colleagues 2'.

In a variable social network service according to an embodiment of the present disclosure, only a basic (default) social network group <friends> is provided initially, and detailed social network groups may be set according to user setting.

The user may group each of the multiple first network subjects in each of the multiple social network groups, thereby forming multiple social networks.

Figure 16:
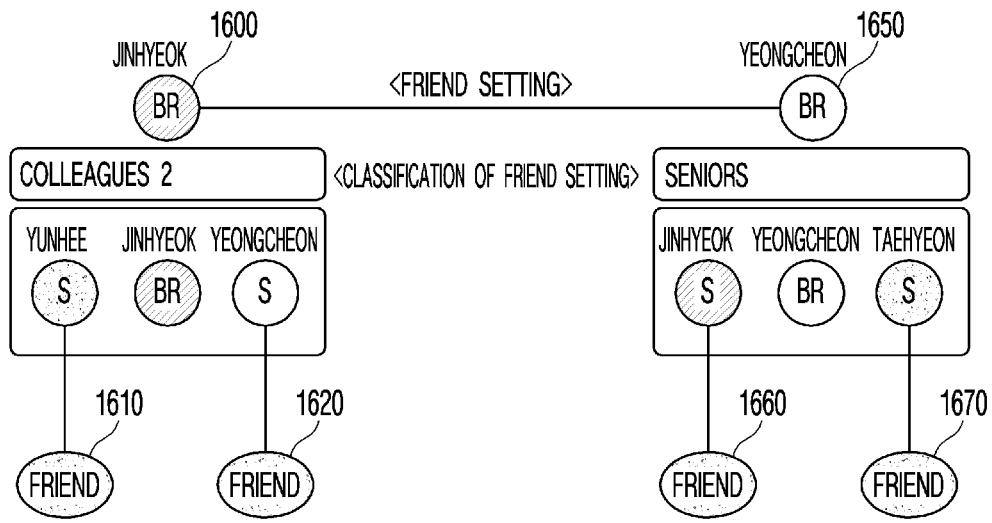
FIG. 16 is a view illustrating the concept of a multiple network setting method according to a social network group setting according to an embodiment of the present disclosure.

FIG. 16 is a view illustrating the concept of a multiple network setting method according to a social network group setting according to an embodiment of the present disclosure.

FIG. 16 illustrates a method where a user sets a first network subject in a certain social network group. Especially, FIG. 16 illustrates a case where the user serves as a bridge in the certain social network group.

Referring to FIG. 16, JinHyeok 1600 may serve as a bridge in a social network group 'colleagues 2'. In the case where JinHyeok 1600 serves as a bridge, the social network may be expanded up until a first network subject 1610 and 1620 of each of YunHee and YeongCheon 1650 included in the social network group 'colleagues 2'. More specifically, the first network subject 1610 of YunHee may form an expanded social network with YeongCheon 1650 by the medium of JinHyeok 1600, and the first network subject 1620 of YeongCheon 1650 may form a social network with YunHee by the medium of JinHyeok 1600.

Likewise, YeongCheon 1650 may serve as a bridge in the social network group 'seniors'. In the case where YeongCheon 1650 serves as a bridge, the social network may be expanded up until a first network subject 1660 and 1670 of each of JinHyeok 1600 and TaeHyeon included in the social network group 'seniors'. More specifically, through the expanded social network, a first social subject 1660 of JinHyeok 1600 may form a social network with TaeHyeon by the medium of YeongCheon 1650, and a first network subject 1670 of TaeHyeon may form a social network with JinHyeok 1600 by the medium of YeongCheon 1650.

That is, whether or not one serves as a bridge in a user's social network group has a variable effect on determining a social network group. The user may determine whether or not to serve as a bridge in each of the multiple social network groups, and the effects of the user serving as a bridge in a certain social network group is attributed to the certain social network group.

Figure 17:
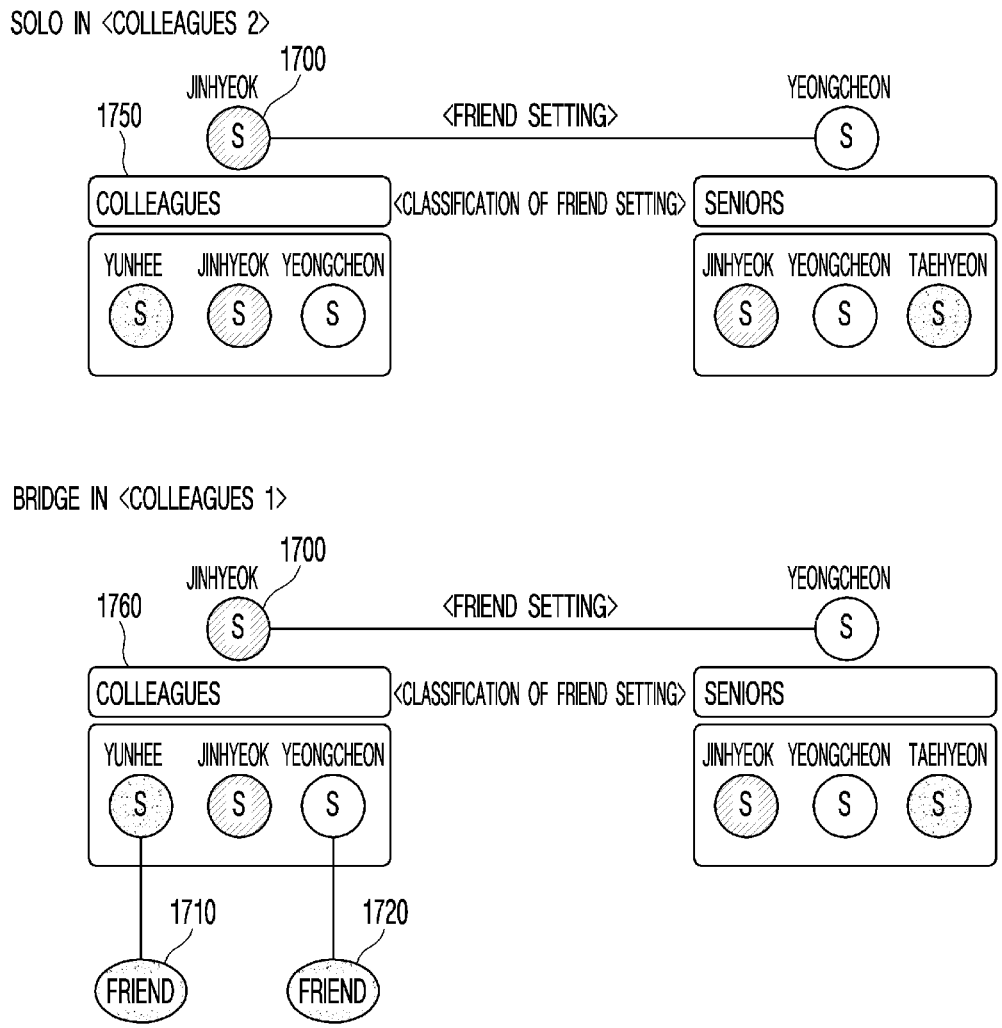
FIG. 17 is a view illustrating the concept of a multiple network setting method according to a social network group setting according to an embodiment of the present disclosure.

FIG. 17 are views illustrating the concept of a multiple network setting method according to a social network group setting according to an embodiment of the present disclosure.

FIG. 17 illustrates a method where a user sets a first network subject in a certain social network group. Especially, FIG. 17 illustrates a case where the user serves as a bridge in a certain social network group and serves as a non-bridge in another social network group.

Referring the top view of FIG. 17, JinHyeok 1700 may serve as a non-bridge (or solo) in a first social network group 'colleagues 2' 1750. The first social network group 'colleagues 2' 1750 may include YunHee, JinHyeok 1700 and YeongCheon, and YunHee, JinHyeok 1700 and YeongCheon included in the first social network group 'colleagues 2' 1750 may perform social networking.

JinHyeok 1700 may serve as a bridge in a second social network group 'friends 1' 1760. The second social network group 'friends 1' 1760 may include YeongCheol, JinHyeok 1700 and TaeHyeon. In the case where JinHyeok 1700 serves as a bridge in the second social network group 'friend 1' 1760, the social network may be expanded up until the first network subject of each of YeongCheol and TaeHyeon.

That is, the user may serve as a bridge or a non-bridge in each of the multiple social network groups.

As aforementioned, a social network group of a first network subject may be variably changed. For example, after JinHyeok classifies YeongCheon in the social network group 'colleagues 2' in FIG. 17, and then changes YeongCheon to the social network group 'friends 1', a new social networking effect between YeongCheon and JinHyeok may occur.

The functions illustrated above with reference to FIGS. 1 to 17 may be provided by a variable social network service apparatus. The functions illustrated above with reference to FIGS. 1 to 17 may be processed by a processor of a variable social network service apparatus and serviced to the user.

The variable social network service method as aforementioned may be realized as an application or in the form of a program command that may be performed through various computer components and be recorded in a computer-readable record medium. The computer-readable record medium may include a program command, a data file, a data structure and the like solely or in combinations.

The program commands to be recorded in the computer-readable record medium may be those specially designed and configured for the present disclosure or those well known to one skilled in the computer software field.

Examples of the computer-readable record medium include magnetic media such as hard disk, floppy disk and magnetic tape, optical record media such as CD-ROM and DVD, magneto-optical media such as floptical disk, and hardware apparatuses specially configured to store and perform program commands, such as ROM, RAM, flash memory and the like.

Examples of the program commands include not only machine language codes such as those made by compilers, but also high-level language codes that may be implemented by computers using interpreters and the like. The hardware apparatus may be configured to operate as one or more software modules in order to perform processes according to the present disclosure, and vice versa.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A variable social network service method comprising:
   receiving, by a variable social network service apparatus, via a user interface of a user apparatus of a user, user input on whether or not the user is serving as a bridge in a social network, the user having a direct social network relationship with a plurality of direct network subjects and an only indirect social network relationship with a plurality of indirect network subjects;
   storing the user input on a memory of the variable social network service apparatus;
   determining whether or not to expand the social network based on the user input using a processor that analyzes the user input and makes determinations based on the user input; and
   determining, by the processor, whether or not social networking is possible between a first direct network subject of the plurality of direct network subjects and a first indirect network subject of the plurality of indirect network subjects depending on whether or not the user is serving as the bridge, wherein the processor determines that social networking is possible between the first direct network subject and the first indirect network subject if the user is serving as the bridge and the processor determines that social networking is not possible between the first direct network subject and the first indirect network subject if the user is not serving as the bridge,
   wherein the first indirect network subject has a direct social network relationship with a second direct network subject of the plurality of direct network subjects, and the first indirect network subject has an only indirect social network relationship with the first direct network subject,
   wherein the first direct network subject requests the user for an introduction to a third direct network user of the plurality of direct network subjects when the user is serving as the bridge, the first direct network subject having an only indirect social network relationship with the third direct network subject, wherein the user interface allows the user to select a lightning blind date function to propose a date to any direct network subject of the plurality of direct network subjects, wherein the user interface allows the user to select a show interest function to indicate interest in any direct network subject of the plurality of direct network subjects, wherein the user interface allows the user to select a role changing function to change from serving as the bridge to not serving as the bridge and vice versa, and wherein the variable social network service apparatus comprises the processor, which is in operable communication with the memory.

2. The variable social network service method according to claim 1, wherein the user interface allows the user to select a friend introduction function to arrange a couple matching among direct network subjects of the plurality of direct network subjects if the user is serving as the bridge.

3. The variable social network service method according to claim 2, wherein the processor reduces the social network expanded due to the user serving as the bridge if the user is converted from the bridge to a non-bridge.

4. The variable social network service method according to claim 3, further comprising:

receiving, by the variable social network service apparatus, via the user interface, social network grouping information of the plurality of direct network subjects; and changing, by the processor, the social network based on the social network grouping information, wherein the social network grouping information is information on a social network group including a subset of the direct network subjects of the plurality of direct network subjects, and wherein the social network group is variable depending on a setting entered by the user via the user interface.

5. The variable social network service method according to claim 1, further comprising:

receiving, by the variable social network service apparatus, via the user interface, social network grouping information of the plurality of direct network subjects; and changing, by the processor, the social network based on the social network grouping information, wherein the social network grouping information is information on a social network group including a subset of the direct network subjects of the plurality of direct network subjects, and wherein the social network group is variable depending on a setting entered by the user via the user interface.

6. A variable social network service apparatus comprising:

a memory configured to store user input from a user interface of a user apparatus of a user; and a processor that analyzes the user input and makes determinations based on the user input, the processor being configured to:

receive the user input on whether or not a user is serving as a bridge in a social network, the user having a direct social network relationship with a plurality of direct network subjects and an only indirect social network relationship with a plurality of indirect network subjects;

determine whether or not to expand the social network based on the user input; and determine whether or not social networking is possible between a first direct network subject of the plurality of direct network subjects and a first indirect network subject of the plurality of indirect network subjects depending on whether or not the user is serving as the bridge, wherein the processor determines that social networking is possible between the first direct network subject and the first indirect network subject if the user is serving as the bridge and the processor determines that social networking is not possible between the first direct network subject and the first indirect network subject if the user is not serving as the bridge, wherein the first indirect network subject has a direct social network relationship with a second direct network subject of the plurality of direct network subjects, and the first indirect network subject has an only indirect social network relationship with the first direct network subject, wherein the processor is further configured to receive a request for the user from the first direct network subject for an introduction to a third direct network user of the plurality of direct network subjects when the user is serving as the bridge, the first direct network subject having an only indirect social network relationship with the third direct network subject, wherein the user interface allows the user to select a lightning blind date function to propose a date to any direct network subject of the plurality of direct network subjects, wherein the user interface allows the user to select a show interest function to indicate interest in any direct network subject of the plurality of direct network subjects, wherein the user interface allows the user to select a role changing function to change from serving as the bridge to not serving as the bridge and vice versa, and wherein the variable social network service apparatus comprises the processor, which is in operable communication with the memory.

7. The variable social network service apparatus according to claim 6, wherein the user interface allows the user to select a friend introduction function to arrange a couple matching among direct network subjects of the plurality of direct network subjects if the user is serving as the bridge.

8. The variable social network service apparatus according to claim 7, wherein the processor is configured to reduce the social network expanded due to the user serving as the bridge if the user is converted from the bridge to a non-bridge.

9. The variable social network service apparatus according to claim 8, wherein the processor is further configured to receive, via the user interface, social network grouping information of the plurality of direct network subjects, and change the social network based on the social network grouping information, wherein the social network grouping information is information on a social network group including a subset of the direct network subjects of the plurality of direct network subjects, and wherein the social network group is variable depending on a setting entered by the user via the user interface.

10. The variable social network service apparatus according to claim 6, wherein the processor is further configured to receive, via the user interface, social network grouping information of the plurality of direct network subjects, and change the social network based on the social network grouping information, wherein the social network grouping information is information on a social network group including a subset of the direct network subjects of the plurality of direct network subjects, and wherein the social network group is variable depending on a setting entered by the user via the user interface.

* * * * *